United States Patent [19]

McReynolds, Jr.

[11] 4,120,023

[45] Oct. 10, 1978

[54] LENS CLOSURE FOR SPORTS LIGHT FIXTURE

[75] Inventor: Glen Harold McReynolds, Jr., Austin, Tex.

[73] Assignee: Esquire, Inc., New York, N.Y.

[21] Appl. No.: 794,945

[22] Filed: May 9, 1977

[51] Int. Cl.[2] .............................................. G03B 15/02

[52] U.S. Cl. ...................................... 362/16; 362/255; 362/294; 428/522

[58] Field of Search .................. 362/16, 89, 255, 294, 362/341, 397; 427/163; 428/522

[56] References Cited

U.S. PATENT DOCUMENTS

| | | | |
|---|---|---|---|
| 2,774,702 | 12/1956 | Smith | 428/522X |
| 2,983,811 | 5/1961 | O'Brian | 362/189 |
| 3,222,204 | 12/1965 | Weber et al. | 427/163 |
| 3,351,409 | 11/1967 | McGuire | 362/255 X |
| 3,429,732 | 2/1969 | Baitinger, Jr. | 428/522 X |
| 3,737,226 | 6/1973 | Shank | 362/16 X |
| 3,930,103 | 12/1975 | Chimura et al. | 427/163 X |

*Primary Examiner*—Peter A. Nelson
*Attorney, Agent, or Firm*—Vaden, III Frank S.

[57] ABSTRACT

A permanent type closure for securing a thin film lens on a light fixture which is entered from the rear for replacement purposes including a preferably metallic band and gasket.

8 Claims, 3 Drawing Figures

FIG. 1
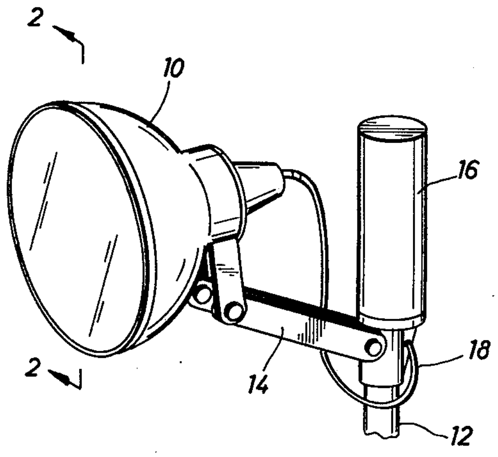
FIG. 2
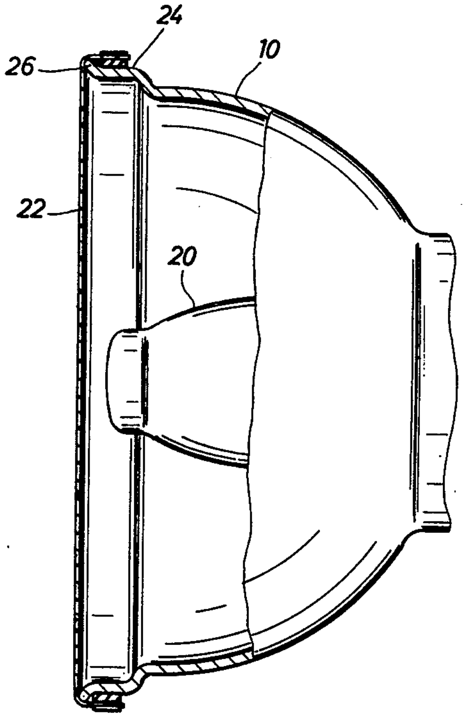
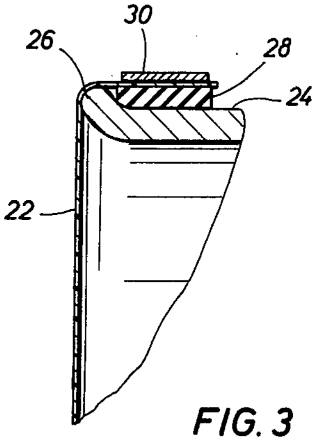
FIG. 3

LENS CLOSURE FOR SPORTS LIGHT FIXTURE

BACKGROUND OF THE INVENTION

1. Field of the Invention

This invention pertains to lighting fixtures having a fluoroplastic lens over its light emanating opening and more specifically to such fixtures having such a permanently secured lens.

2. Description of the Prior Art

Commercial lighting fixtures each enclosing one or more bulbs or lamps usually include a large window opening through which light emanates from the bulbs or lamps. The normal material used for closing this window is clear glass. In some installations frosted or otherwise partially opaque glass is employed to soften or diffuse the light.

In a typical installation of a high intensity discharge lamp, such as a mercury vapor lamp, the window opening closed by a pane of clear glass may be approximately two feet by two feet. The entire lighting fixture may be one of a plurality mounted in a high ceiling over a laboratory, industrial process area, a warehouse or similar area.

Although plastics have been substituted for glass in many applications, such as for canopies of airplanes, contact lenses, lenses for photocells and many, many other applications, previous to the development of the lens described in U.S. Pat. No. 3,812,342, substitution had never been totally satisfactory in the high temperature, prolonged use, often abusive environment that high intensity discharge lamps are subjected to. An article by J. T. Barnes appearing in *Lighting Design & Application,* December 1972, is believed to reflect the current state of knowledge. The findings of Barnes is that for short-term use in a high temperature, high ultraviolet environment, there are some coated polycarbonates that might be considered reservedly acceptable. For general low temperature, use, some acrylics (such as Plexiglas) are acceptable. For high temperature use (over 105° C.), there was no known substitute for glass. The sole exception was that in extreme breakage areas or hazardous locations with inside temperatures not in excess of 125° C., polycarbonate may be substituted, provided a very limited service life is acceptable. There are so many characteristics besides accommodation to the above that have to come together in a single plastic, that it was a remarkable discovery that any plastic could be suitable. For example, for a clear light fixture lens application, there had to be good optical, low-backscatter properties, not just initially, but after months and even years of use. Since most plastics, and even some fluoroplastics, degrade when exposed to ultraviolet light, the selection of a plastic with acceptable optical properties was extremely difficult. Further, as noted above, the high temperatures attendant to high intensity discharge lamps is also a critical problem pertaining to the selection of a suitable material.

Moreover, unless there was a vast saving in weight, the economics of the substitution did not make any sense. The most common glass substitute for large panes is probably Plexiglas, which is rigid and commonly seven-thirty-seconds inch thick (approximately 250 mils). Because it optically degrades under high temperature conditions and for other reasons, it is not acceptable. Lexan, another sometime glass substitute in other contexts, does withstand high temperatures better then Plexiglas, but it yellows to an objectionable extent.

The primary advantages of glass as a fixture closure or lens include its low cost, its ready availability, its resistance to high operating temperatures, such as emanate from high wattage lamps, its resistance to changes in color and opaqueness, even over a prolonged period of time, and its uniform light transmittance qualities over the full range of the visible spectrum.

Glass as a closure for such a fixture has a number of disadvantages, however. First, it is breakable. Should something accidentally strike the glass or should the bulb within the fixture explode, the glass is very likely to break, causing not only an inconvenience to the persons working in the area, but also creating a hazard. So-called non-breakable tempered or safety glass is available and is used. But, even tempered glass does break. In such case, beads result, rather than jagged pieces, but even beads can be hazardous.

Further, glass is thought of as being relatively slick and therefore resistant to the build up of dust. However, as most persons can attest to who have had experience with dust build-up on glass, it really does not take very long for an appreciable amount to accumulate. The rapid accumulation of dust results in reduced illumination from the fixture and a requirement to clean the fixture. The more often someone has to clean the fixture, the more expensive is the maintenance.

The glass used in a fixture such as the one described above is also an appreciable percentage of the overall weight of the fixture. A lighter window closure would effect a reduction in manufacturing and shipping costs.

As previously mentioned, U.S. Pat. No. 3,812,342 reveals an opening or lens structure which is suitable for many types of lighting installations. However, one type of installation which is not covered by the structures there revealed is for the fixture which is entered from the rear for bulb replacement purposes. Such a fixture is prevalent in outdoor sporting installations (e.g., for lighting tennis courts, baseball diamonds, and the like) and is known as a sports light. For purposes hereof, any light fixture which is not entered through the window lens, such as in the manner illustrated in the U.S. Pat. No. 3,812,342, is referred to as a sports light, regardless of the actual use or installation of such light.

It is therefore a feature of this invention to provide an improved lighting fixture, especially a rear entry fixture, having a fluorocarbon lens that is permanently secured to the fixture housing:

It is another feature of this invention to provide an improved lighting fixture, especially a rear entry fixture, having a flurocarbon lens that overlaps the outer edge and is secured with respect to a rim requiring no special frame-clamping components.

SUMMARY OF THE INVENTION

Fluoroplastics, or fluorocarbon polymers, all have the property of having a resistance to high temperatures, being light weight in small thicknesses and being unbreakable. Some fluoroplastics, and in particular Teflon FEP (a fluorocarbon copolymer made by polymerizing a mixture of tetrafluoroethylene and hexafluoropropylene), have the additional properties of being nearly transparent in thin-film form (no thicker than about 10 mils), having a high and uniform light-spectrum transmittance, having a long-term aging quality without appreciable discoloring, and having an extremely low coefficient of friction and therefore providing a dust resistant surface. It has been discovered that a lighting fixture closure made of such a material has sufficiently equal or superior qualities in all of its necessary characteristics that it is an overall superior closure to that of glass.

In a lighting fixture which is entered from the rear for bulb replacement, it is convenient to stretch a lighting fixture closure in the form of a thin-film transparent lens or window for the fixture over the rim and to squeeze such lens into place using a gasket and a preferably metallic steel band. When the housing of the fixture is aluminum, heat expansion of the fixture during light operation actually tightens the band in place due to the difference between the temperature coefficient of aluminum compared with that of steel.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiment thereof which is illustrated in the appended drawings, which drawings form a part of this specification. It is to be noted, however, that the appended drawings illustrate only a typical embodiment of the invention and are therefore not to be considered limiting of its scope, for the invention may admit to other equally effective embodiments.

In the drawings

FIG. 1 is an oblique view of a preferred embodiment of the present invention.

FIG. 2 is a sectional view taken at Section line 2—2 of the embodiment illustrated in FIG. 1.

FIG. 3 is an enlarged sectional view of the connection of the lens with respect to the lighting fixture of the embodiment of the invention shown in FIG. 1.

DESCRIPTION OF THE PREFERRED EMBODIMENT

Several qualities are necessary or highly desirable for the material of a lighting fixture window or lens. Not having one or more of these qualities or properties, eliminates, from a practical standpoint, many materials that might be otherwise assumed to be acceptable. Suitable materials should have all of the following characteristics: be unbreakable and impact resistant; resistant to high temperatures beyond the range of use application, and especially be nonflammable, nontoxic and noncontaminating; prossesive of a low coefficient of friction (and therefore be resistant to dust build up); be translucent, and in some applications, be at least nearly transparent; be essentially inert to environmental conditions of use for prolonged periods of time and particularly be essentially immune to ultraviolet degradation when used with a lamp such as a fluoroescent or mercury vapor lamp, which emits a large amount of such radiation; be possessive of good transmittance qualities over the full visible spectrum, and preferably well into both the ultraviolet and infrared ranges; and be at least cost-competitive with glass in the use dimension.

The material that has been discovered that exhibits all of the above properties appears to be Teflon FEP. Teflon is a registered trademark of E. I. duPont de Nemours, Inc. Teflon FEP is a fluorocarbon copolymer made by polymerizing a mixture of tetrafluoroethylene and hexafluoropropylene (which are fluorinated ethylene and a fluorinated propylene). The properties of the final polymer can be varied slightly by changing the ratio of the two monomers.

It has been discovered that in addition to exhibiting all of the above qualities, Teflon FEP is meltextrudable so that thin-film production is readily accomplished. Teflon FEP is readily produced in thicknesses of 10 mil and less. If fact, a 5 mil thickness has been found to be the optimum thickness as a compromise between strength and transmittance for Teflon FEP. At this thickness the strength is still ample to resist tearing even upon accidental impact. On the other hand, it exhibits only a very, very slight bluish cast and is still essentially transparent. In fact, the transmittance of Teflon FEP at this thickness is greater than for one-fourth inch glass, the preferred thickness for glass which is subjected to tempering.

Teflon, and particularly Teflon FEP, is the most inert of all plastics known, and is virtually immune to all normal environmental conditions, including direct exposure to ultra-violet rays for prolonged periods of time. In addition Teflon FEP withstands temperatures from $-270°$ C. to $+205°$ C. In outdoor exposure testing in Florida there was no measurable change in the material in any regards after a 10-year test.

Teflon FEP may be secured as a lens in any of the frame structures described above. In addition, Teflon FEP may also be invisibly surface treated for bonding one or both sides thereof with adhesives. Therefore, its superior anti-stick property does not preclude securing to a frame as a closure via such an adhesive, if desired.

Teflon FEP is not the only Teflon material that is suitable, however. Teflon TFE may also be used, particularly where it is not a requirement that the lens be nearly transparent, such as where glazed or frosted glass would otherwise be used. Teflon TFE is a fluorocarbon homopolymer called polytetrafluoroethylene, tetrafluoroethylene (TFE) being a single monomer which is polymerized to give the polymer. Since it is the only monomer, the polymer is a homopolymer.

Teflon TFE has essentially all of the desirable properties of Teflon FEP except for its translucent quality. It is a milky white at thicknesses of approximately 5 mil. It is also a little more expensive to produce in sheet or lens form, since to produce sheets, it is normal to shave a solid block, rather than to merely extrude the material in sheet form, as with Teflon FEP.

Teflon FEP and TFE are both considered generically as fluorocarbon polymers and are known commercially as fluoroplastics. Other fluorocarbon polymers exhibiting qualities that would indicate they are acceptable as lens materials are Tefzel, which is a copolymer of ethylene and tetrafluoroethylene (referred to generically as ETEE); "Kel-F", which is polychlorotrifluoroethylene (CTFE) and polyvinylidene fluoride. In addition, polymethylpentene and polysulfone also exhibit temperature, optical and other characteristics that would indicate their acceptability as lens materials.

For purposes herein, "thin film" refers to any of the acceptable materials as discussed above used in conjunction with a lighting fixture as its lens or window material through which light emanates during operation.

Now referring to the drawings, and first to FIG. 1, a light fixture 10 is shown supported on post 12 by an articulated bracket 14. Post 12 also supports ballast 16 for achieving operation of the lamp within light fixture 10. A connection cord 18 between ballast 16 and the lamp within fixture 10 achieves electrical connection for this purpose.

Now referring to FIG. 2, a cutaway sectional view of the front portion of light fixture 10 is shown, lamp 20 therein being positioned so that its axis and the axis of light fixture 10 coincide. It will be noted that the projection on lamp 20 terminates before it reaches the plane of the opening of fixture 10 and does not break the plane of lens 22 stretched thereover. Lens 22 is a thin film material typically made from the fluorocarbon products discussed above.

Light fixture 10 at its extremity adjacent its opening has a flat rim portion 24 which is approximately parallel to the axis of the fixture. Right at the opening, rim 24 curves outwardly away from the axis to form rim projection 26.

In mounting lens material 22 across the opening of the light fixture, a resilient gasket 28 is placed around rim 24 and adjacent to rim projection 26. Film 22 is stretched over the opening of the fixture and pressed back over gasket 28. A band 30 is then placed over gasket 28 and the part of lens 22 which is over gasket 28 and secured in place. Typically, band 30 is a steel metallic band and the clamping in place is accomplished as in placing similar bands around packing boxes. That is, a crimping and closure mechanism well-known in the art is used to pull the band tight and to lock the band in place.

Alternatively, it is possible to use a connection such as employed in connecting radiator hose clamps.

In operation of a 1500 watt bulb in an ambient temperature of 24° C., readings at rim 24 on an aluminum reflector have been measured on the order of about 105° C. When a silicon gasket was used for gasket 28, temperature readings on a metallic band used to hold the lens in place registered about 75° C. This temperature difference actually tightens up the connection considerably since the aluminum expands more than the steel. Therefore, the lens remains in place and is not loosened during heating.

Although illustrated and described as being metallic, band 30 may be nylon or other convenient material. As previously mentioned, gasket may be either rubber, silicon or other suitable material.

It may be noted that the lens does not have to be replaced in order to replace a burned out light bulb 20, since the connection as shown permits removal of the socket unit for bulb replacement purposes.

It should also be noted that the electrical connection 18 to ballast 16 provides a conduit for "breathing" or for ventilating the internal structure of light fixture 10 to the atmosphere through inherently present openings in ballast 16. This permits the pressure inside and outside of lamp 16 to reach an equilibrium during heating and cooling of the lamp to thereby avoid placing a pressure differential on lens 22 which might cause the lens 22 to unduly stretch or tear.

While a particular embodiment of the invention has been shown, it will be understood that the invention is not limited thereto, since may modifications may be made and will be apparent to those skilled in the art. For example, the thin film lens material does not have to be between the gasket and the band. Such lens may instead be located between the gasket and the rim since the resiliency of the gasket is soft enough to inhibit tearing of the lens material in this position even after the metallic band is tightened thereover. Hence, it will be understood that the gasket may directly be over the rim or over the lens material and the rim. Likewise, the lens material may be over the gasket and rim or only directly over the rim.

What is claimed is:

1. A lighting fixture combination, comprising a housing for enclosing at least one light bulb therein that emits light in the visible spectrum, such that said bulb is sufficiently recessed so that the plane of an opening through which light emanates does not intersect said bulb, said housing including entry means to access said bulb other than through said light emanating plane;

said housing including an external gasket rim located behind said light emanating plane and perpendicular thereto;

a gasket located over at least a part of said rim;

a housing window comprising a thin film of fluorocarbon polymer combining tetrafluoroethylene and hexafluoropropylene stretched across said opening and said gasket rim; and a closing band securing said gasket and said window thin film against said rim.

2. A lighting fixture combination in accordance with claim 1, wherein said housing includes a radially outwardly projecting rim projection located between said rim and said opening.

3. A lighting fixture combination in accordance with claim 1, wherein said closing band is metallic.

4. A lighting fixture combination in accordance with claim 3, wherein said metallic closing band is steel.

5. A lighting fixture combination in accordance with claim 1, wherein said closing band is secured by a non-adjustable closure.

6. A lighting fixture combination in accordance with claim 1, wherein said closing band is secured by an adjustable closure.

7. A lighting fixture combination in accordance with claim 1, wherein said housing window is also positioned over said gasket and beneath said closing band.

8. A lighting fixture combination in accordance with claim 1, wherein said housing is vented to prevent excessive pressure differentials between the internal and external environment of said fixture when said bulb heats and cools.

* * * * *